(No Model.)
W. J. KING.
HAY SLING.
No. 599,144. Patented Feb. 15, 1898.
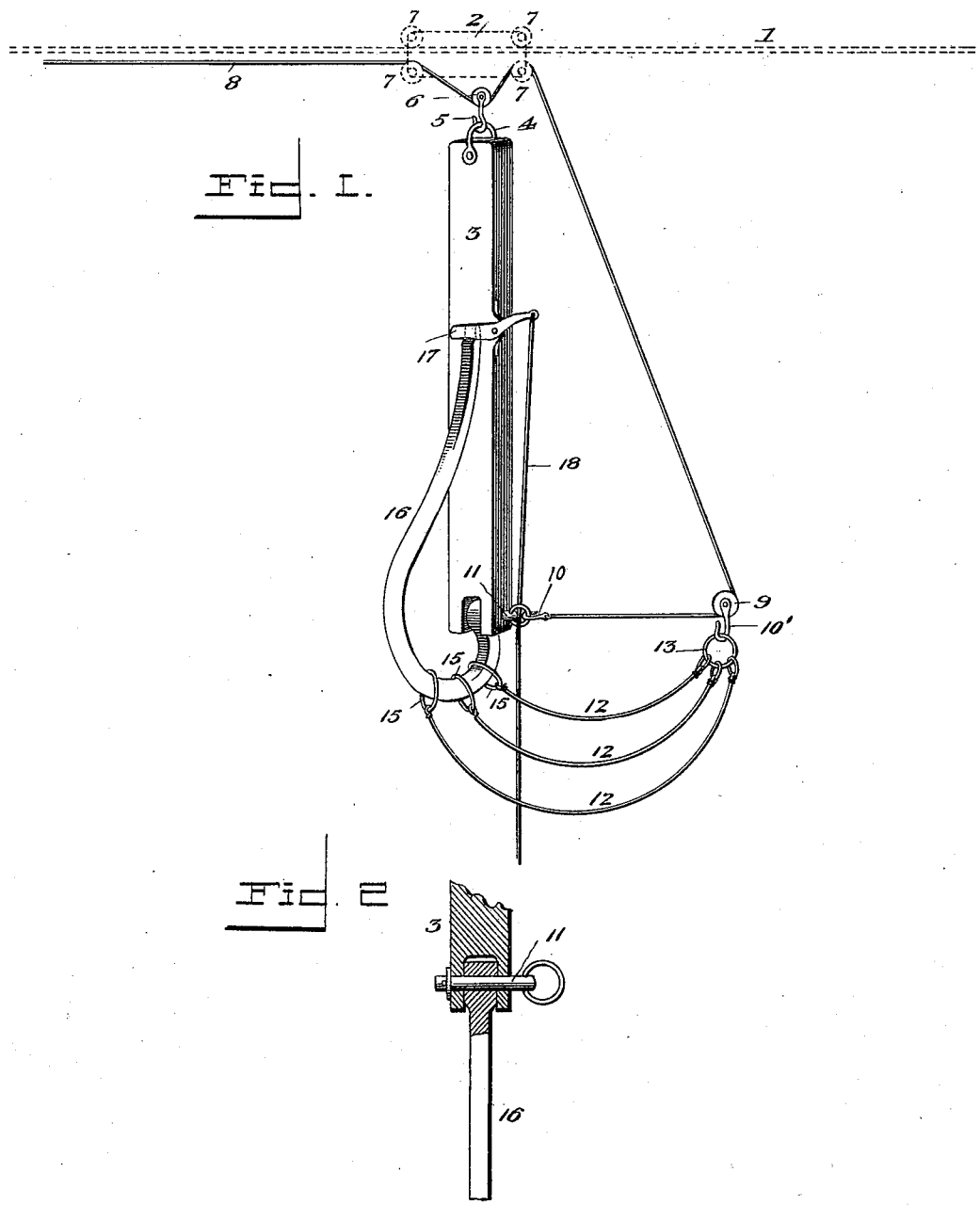
Witnesses
Inventor
W. J. King
by H. B. Willson & Co.
Attorneys

United States Patent Office.

WILLIAM J. KING, OF BAVINGTON, PENNSYLVANIA.

HAY-SLING.

SPECIFICATION forming part of Letters Patent No. 599,144, dated February 15, 1898.

Application filed October 12, 1897. Serial No. 654,965. (No model.)

*To all whom it may concern:*

Be it known that I, WILLIAM J. KING, a citizen of the United States, residing at Bavington, in the county of Washington and State of Pennsylvania, have invented certain new and useful Improvements in Hay-Slings; and I do declare the following to be a full, clear, and exact description of the invention, such as will enable others skilled in the art to which it appertains to make and use the same.

My invention has relation to hay-slings, and more particularly to that class of slings used in connection with overhead carriages, and is designed for the purpose of lifting bundles of hay or grain from a wagon and conveying them to the loft or other place in a barn.

The object of the invention is to simplify the construction and provide an inexpensive, durable, and easily-operated sling.

With this object in view the invention consists of certain features of construction and combination of parts which will be hereinafter fully described and claimed.

Figure 1 is a perspective view showing the application of my invention, illustrating in dotted lines the elevated track and its traveling carriage. Fig. 2 is an enlarged detail view of the lower end of the supporting-bar, illustrating the manner of pivoting the hook thereto.

In said drawings, 1 illustrates the elevated track, and 2 its carriage. The track and carriage may be provided with suitable or any well-known catching or releasing devices common in this class of inventions, and as neither the track, carriage, nor releasing devices form any part of my invention I have not deemed it necessary to illustrate in detail the carriages and releasing devices, but have simply shown conventionally the carriage and its track.

3 denotes the supporting-bar, which is provided with a ring 4, that is connected with a hook 5 of a pulley 6, through which and pulleys 7 of the carriage runs the draft-rope 8, one end of which is adapted to be hitched to a horse and the other end of which passes through a pulley 9 and is provided with a hook 10, which is engaged with a ring of a pin 11, that is inserted through the lower slotted end of the bar.

12 denotes the suspending-ropes, the ends of which are connected to a ring 13, that engages the hook 10' of the pulley 9, while each of the other ends of these cords is provided with a ring or link 15, that is engaged upon the lower end of a hook 16, having its lower end pivoted in the recessed end of the bar by the pin 11. The upper end of this hook 16 is held in a vertical position by a pivoted trip-lever 17, from which leads a cord 18 through the ring of the pin 11 within reach of the attendant upon the ground. By drawing upon this rope the trip will be removed from engagement with the upper end of the lever 16, and the weight of the hay or grain will throw the upper end of said lever downwardly, thus freeing the links from said lever and allowing the load to discharge at the point desired.

Having thus described my invention, what I claim, and desire to secure by Letters Patent, is—

A hay-sling comprising a bar having a recess at its lower end, a hook 16 having an eye at its lower end located in said recess, a pin passing through the lower end of the bar and eye, and provided with a ring 11, the upper end of said hook curved outward and inward and lying in the plane of a vertical line that cuts the bend of said hook and bearing against the side of said bar, a trip-lever pivoted to said bar and adapted to hold the upper end of the lever in contact with the bar, a trip-rope, a pulley 9 provided with a hook 10', sling or supporting ropes 12 connected together at one end by a ring 13 that is hung on the hook 10' and having their other ends disconnected and provided with rings 15 that engage the bend of the hook, and a draft-rope connected to the ring, pulley 9 and the upper end of the bar and adapted to be connected to an overhead carriage, substantially as set forth.

In testimony whereof I hereunto affix my signature in presence of two witnesses.

WILLIAM J. KING.

Witnesses:
D. M. PRY,
W. R. MALONE.